(12) United States Patent
Takeshima

(10) Patent No.: US 7,180,155 B2
(45) Date of Patent: Feb. 20, 2007

(54) METHOD FOR MANUFACTURING THIN-FILM MULTILAYER ELECTRONIC COMPONENT AND THIN-FILM MULTILAYER ELECTRONIC COMPONENT

(75) Inventor: Yutaka Takeshima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 301 days.

(21) Appl. No.: 10/638,385

(22) Filed: Aug. 12, 2003

(65) Prior Publication Data

US 2004/0043599 A1 Mar. 4, 2004

(30) Foreign Application Priority Data

Aug. 29, 2002 (JP) ............................. 2002-251284

(51) Int. Cl.
*H01L 29/00* (2006.01)

(52) U.S. Cl. .................................................. 257/532

(58) Field of Classification Search ................ 257/319, 257/324, 350, 758, 532, 295–310; 438/238, 438/239, 250, 386, 393, 399, 622; 361/300–314
See application file for complete search history.

(56) References Cited

U.S. PATENT DOCUMENTS

| | | | | |
|---|---|---|---|---|
| 4,701,827 A | * | 10/1987 | Fujikawa et al. ............ 361/309 |
| 5,097,391 A | * | 3/1992 | Nomura et al. .......... 361/321.4 |
| 5,295,289 A | * | 3/1994 | Inagaki et al. .............. 361/304 |
| 5,512,836 A | * | 4/1996 | Chen et al. .................. 361/280 |
| 5,774,326 A | * | 6/1998 | McConnelee et al. ...... 361/313 |
| 5,874,364 A | * | 2/1999 | Nakabayashi et al. ...... 438/738 |
| 6,124,769 A | * | 9/2000 | Igarashi et al. ............. 333/172 |
| 6,236,102 B1 | * | 5/2001 | Kim et al. ................... 257/532 |
| 6,346,866 B2 | * | 2/2002 | Nakakubo et al. .......... 333/204 |
| 6,428,644 B1 | * | 8/2002 | Ohno et al. ............... 156/89.12 |
| 6,462,933 B2 | * | 10/2002 | Takeshima et al. ......... 361/303 |
| 6,528,870 B2 | * | 3/2003 | Fukatsu et al. ............. 257/685 |
| 6,550,117 B1 | * | 4/2003 | Tokuoka et al. ........... 29/25.42 |
| 6,667,237 B1 | * | 12/2003 | Metzler ...................... 438/690 |

(Continued)

FOREIGN PATENT DOCUMENTS

JP 50-119270 9/1975

(Continued)

OTHER PUBLICATIONS

Official Communication dated Feb. 21, 2006, issued in the corresponding Japanese Patent Application No. 2002-251284. (With full English translation).

*Primary Examiner*—Cuong Nguyen
(74) *Attorney, Agent, or Firm*—Keating & Bennett, LLP

(57) ABSTRACT

In a method for manufacturing a thin-film multilayer electronic component, dielectric thin films and thin-film internal electrodes are alternately layered on each other to form a laminate. The thin-film internal electrodes are alternately displaced in a predetermined direction to form an overlap portion. The entire thickness of the laminate and a portion of the thickness of the substrate are cut to form grooves in portions other than the overlap portion, in a direction that is substantially perpendicular to the predetermined direction. External electrodes are formed on at least the cut surfaces of the laminate and the half-cut surfaces of the substrate. Then, the substrate is fully cut in the thickness direction along the grooves such as not to substantially remove the external electrodes.

11 Claims, 9 Drawing Sheets

U.S. PATENT DOCUMENTS 6,689,311 B2 * 2/2004 Morita et al. .................. 419/8

FOREIGN PATENT DOCUMENTS

| JP | 56-144523 | 11/1981 |
| JP | 2-121313 | 5/1990 |
| JP | 7-86082 | 3/1995 |
| JP | 11-317323 | 11/1999 |
| JP | 2000-124056 | 4/2000 |

* cited by examiner

METHOD FOR MANUFACTURING THIN-FILM MULTILAYER ELECTRONIC COMPONENT AND THIN-FILM MULTILAYER ELECTRONIC COMPONENT

BACKGROUND OF THE INVENTION

1. Field of the Invention

The present invention relates to multilayer electronic components, and more particularly, to a method for manufacturing a miniaturized thin-film multilayer electronic component, such as a thin-film multilayer capacitor, having a relatively high capacitance and further relates to such a thin-film multilayer electronic component.

2. Description of the Related Art

A monolithic ceramic capacitor, which is typical of multilayer electronic components, is generally manufactured through the following steps:

(1) An electrode paste is printed on ceramic green sheets having a predetermined size.

(2) Then, a predetermined number of the ceramic green sheets are layered on one another, and ceramic green sheets not printed with the electrode paste are further layered on the upper and lower surfaces of the layered ceramic sheets, followed by contact-bonding under predetermined conditions to prepare a laminate.

(3) The laminate is cut into individual elements and the individual elements are subjected to heat treatment to remove a binder and fired.

(4) An electrode paste is applied to each fired element and burned to form external electrodes.

Thus, the resulting ceramic capacitor conventionally has a chip structure in which a plurality of internal electrodes are each disposed between two ceramic layers and the external electrode are each connected to predetermined internal electrodes.

In such a process for manufacturing a monolithic ceramic capacitor, however, the thickness of each dielectric layer, namely, the ceramic layer, depends on the particle size of the ceramic powder material. Thus, it is impossible to form a thin dielectric layer having a thickness smaller than the particle size of the ceramic powder material.

Also, in order to prevent short circuiting and breaking of electrodes resulting from a defect of the dielectric layers, and to ensure reliability, the thickness of the dielectric layers needs to be 3 μm or more. This makes it difficult to reduce the size of the monolithic ceramic capacitor and increase the capacitance.

As a solution of the above-described problem, a method for manufacturing a thin-film multilayer capacitor in which dielectric layers and internal electrodes are deposited by sputtering, which is one of the methods for forming a thin film, has been proposed in Japanese Unexamined Patent Application Publication No. 56-144523. In this method, $Al_2O_3$, $SiO_2$, $TiO_2$, or $BaTiO_3$ dielectric thin films and thin-film internal electrodes are deposited on a substrate by sputtering, and external electrodes functioning as lead terminals of the internal electrodes are formed by applying and burning an electrode paste. Thus, the method facilitates the manufacture of a thin monolithic ceramic capacitor.

In addition, another method for manufacturing a multilayer capacitor has been disclosed in Japanese Unexamined Patent Application Publication No. 2-121313. In this method, at least three thin-film internal electrodes and at least two dielectric thin films, such as of $BaTiO_3$, are formed on an insulative substrate to prepare a thin-film laminate. The ends of the internal electrodes extend to the outside of the laminate, and external electrodes are formed on both ends of the substrate, including the ends of the internal electrodes, by a dry technique.

However, since, in those techniques for manufacturing a multilayer capacitor using thin films, external electrodes are disposed on both end surfaces of the laminate and substrate, it is necessary to cut the thin-film laminate on the substrate into chip-shaped pieces before the formation of the external electrodes.

In the case of manufacturing an ultra-miniature chip capacitor, unfortunately, it is difficult to handle chips, into which a wafer is cut, to form the external electrodes, and this negatively affects production efficiency.

The above-described problems hold true for other thin-film multilayer electronic components without being limited to the thin-film multilayer capacitors.

SUMMARY OF THE INVENTION

In order to overcome the problems described above, preferred embodiments of the present invention provide a method for efficiently and economically manufacturing a miniaturized, high-performance thin-film multilayer electronic component, and a thin-film multilayer electronic component manufactured by the method.

According to a preferred embodiment of the present invention, a method for manufacturing a thin-film multilayer electronic component includes the step of alternately layering dielectric thin films and thin-film internal electrodes on each other to form a laminate. The thin-film internal electrodes are alternately displaced in a predetermined direction to form an overlap portion. The entire thickness of the laminate and portion of the thickness of the substrate are cut to form grooves in portions other than the overlap portion. The grooves extend in a direction that is substantially perpendicular to the predetermined direction and have cut surfaces of the laminate and half-cut surfaces of the substrate. In this instance, the thin-film internal electrodes are exposed at the cut surfaces of the laminate. External electrodes are formed on at least the cut surfaces of the laminate and the half-cut surfaces of the substrate. Then, the substrate is fully cut in the thickness direction along the grooves so as to substantially maintain the external electrodes.

In the method of preferred embodiments of the present invention, portions other than the overlap portion are cut from the laminate side in a direction that is substantially perpendicular to the displaced direction to form the grooves having cut surfaces of the laminate and half-cut surfaces of the substrate, and the external electrodes are formed on the cut surfaces of the laminate at which the internal electrodes are exposed and on the half-cut surfaces of the substrate. Then, the substrate is fully cut along the grooves so as not to substantially remove the external electrodes. Thus, the external electrodes can be efficiently formed before the laminate with the substrate is cut into elements.

Consequently, a miniaturized high-performance thin-film multilayer electronic component can be efficiently and economically manufactured, without experiencing any of the difficulty of handling that occurs when external electrodes are formed after cutting the laminate into elements.

By cutting the substrate along the grooves so as not to remove the external electrodes, the resulting thin-film multilayer electronic component can achieve a high reliability of connection between the external electrodes and the thin-film internal electrodes.

The step of fully cutting the substrate may be performed so as to form steps, each between a resulting full-cut surface of the substrate and the corresponding half-cut surface. The full cut surface juts out with respect to the half-cut surface.

By cutting the substrate so as to form the steps, the external electrodes on the cut surfaces of the laminate and the half-cut surfaces of the substrate can be surely maintained. Consequently, the resulting thin-film multilayer electronic component can achieve a high reliability of connection between the external electrodes and the thin-film internal electrodes.

The thin-film multilayer electronic component may be a thin-film multilayer capacitor including the substrate, the alternately-layered dielectric thin films and thin-film internal electrodes, and the external electrodes, each electrically connected to predetermined thin-film internal electrodes.

By applying the method of preferred embodiments of the present invention to manufacture of the thin-film multilayer capacitor, a miniaturized thin-film multilayer capacitor can be efficiently and economically obtained, and the resulting capacitor has a high capacitance and exhibits a high reliability.

According to another preferred embodiment of the present invention, a thin-film multilayer electronic component includes a substrate, a laminate on the substrate includes dielectric thin films and thin-film internal electrodes alternately layered on each other, and external electrodes. The substrate has steps, each having one end surface that is flush with a surface of the laminate from which the thin-film internal electrodes are led out and the other end surface jutting out with respect to the end surface flush with the laminate. Each external electrode is disposed on the surface of the laminate and the end surface of the substrate flush with the surface of the laminate.

Since the external electrodes are disposed on the surfaces of the laminate from which the thin-film internal electrodes are led out and on the surfaces that are flush with those surfaces of the laminate, and the substrate has steps each in which the surface of the substrate not having the external electrode juts out with respect to the surface having the external electrode, the thin-film multilayer electronic component can be efficiently and economically manufactured and the size can be reduced. Also, the resulting thin-film multilayer electronic component exhibits excellent performance.

The thin-film multilayer electronic component may further include a protective film on surfaces of the laminate, other than the lead-out surfaces of the laminate, at which the dielectric thin films are exposed.

Since the surfaces at which the thin-film internal electrodes are exposed but not having the external electrodes are covered with the protective film, the thin-film multilayer electronic component can exhibit excellent moisture resistance and impact resistance and a high reliability.

The thin-film multilayer electronic component may be a thin-film multilayer capacitor including the substrate, the alternately-layered dielectric thin films and thin-film internal electrodes, and the external electrodes, each electrically connected to predetermined thin-film internal electrodes.

By applying the structure of the thin-film multilayer electronic component to a thin-film multilayer capacitor, the capacitor can be efficiently and economically manufactured and the size of the capacitor can be reduced. Also, the resulting capacitor has a high capacitance and a high reliability.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The present invention will further be illustrated in detail with reference to preferred embodiments thereof.

Preferred embodiments will be described using a thin-film multilayer capacitor as the thin-film multilayer electronic component.

Figure 1:
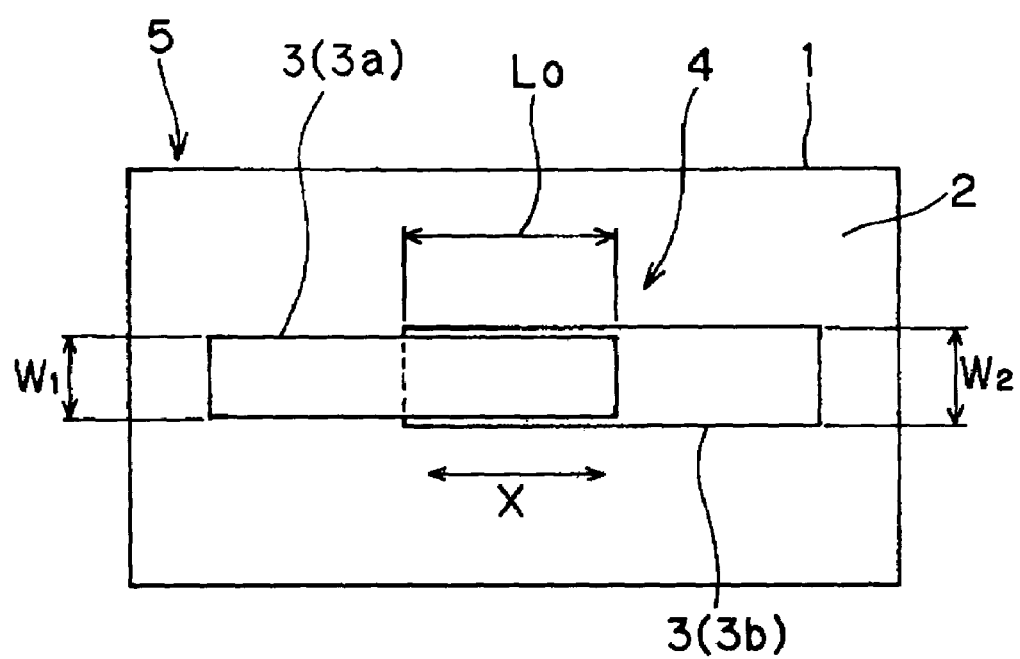
FIG. 1 is a transparent plan view of a laminate according to a preferred embodiment of the present invention, prepared by layering dielectric thin films and thin-film internal electrodes on a substrate.
Figure 2:
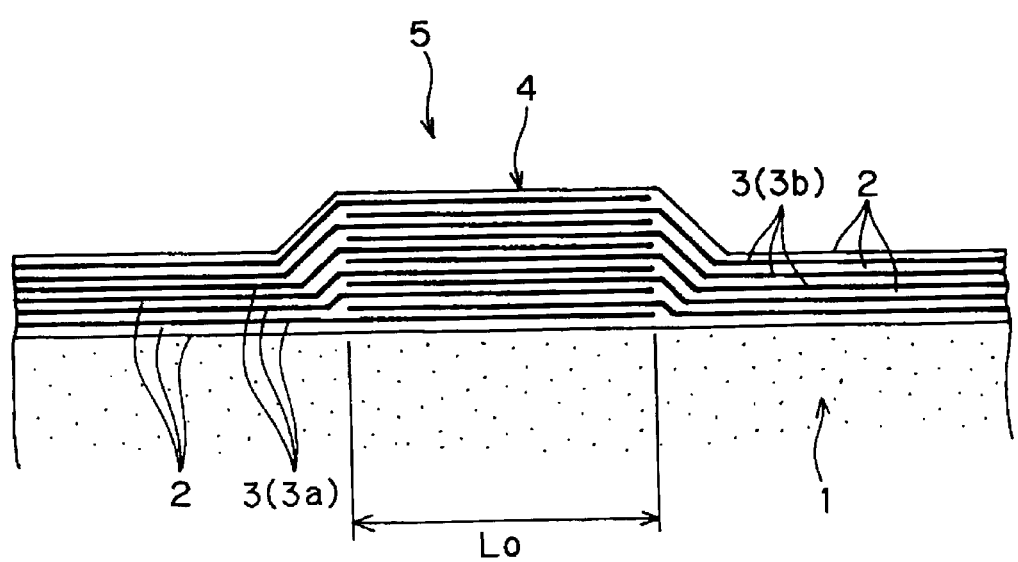
FIG. 2 is a front sectional view of main portions of the laminate shown in FIG. 1.
Figure 3:
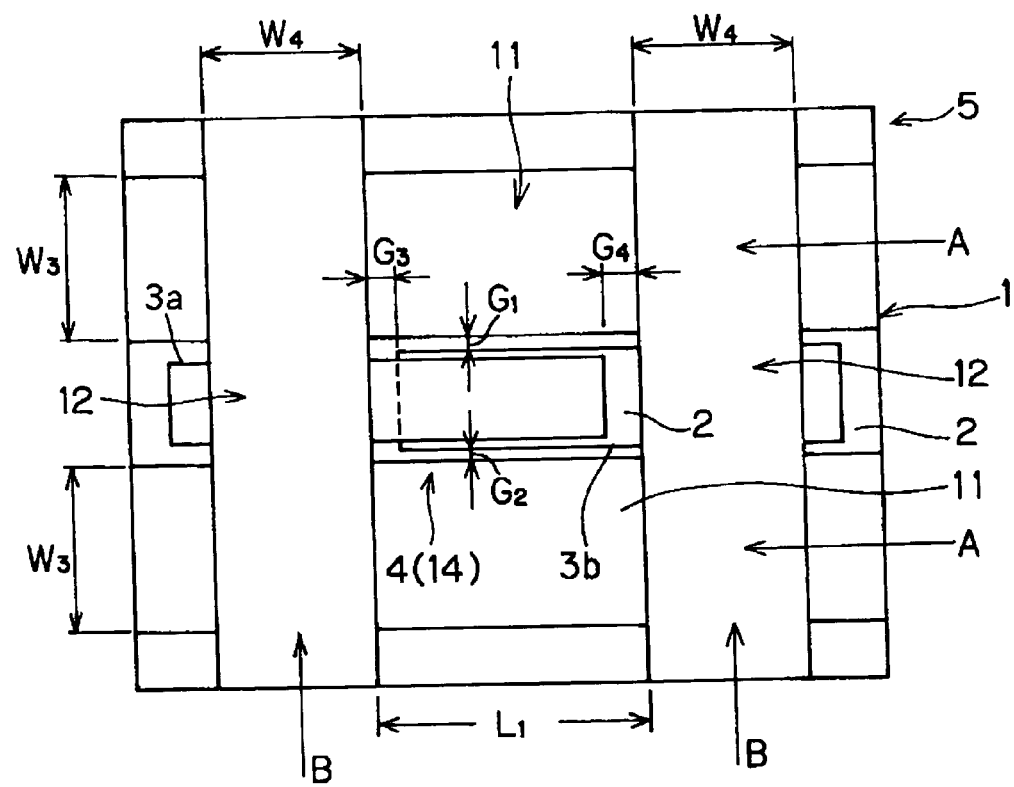
FIG. 3 is a plan view of a laminated structure according to a preferred embodiment of the present invention, including the substrate and the laminate and having grooves.
Figure 4:
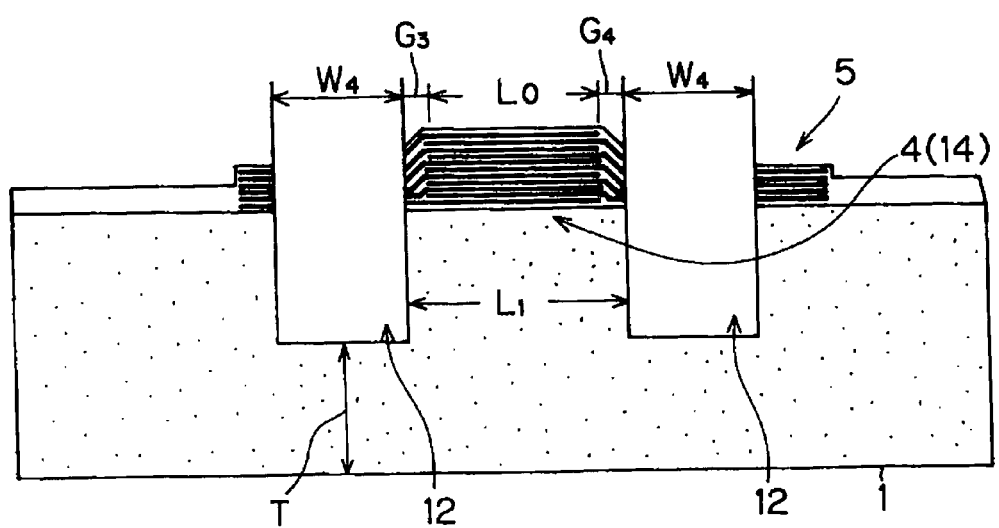
FIG. 4 is a front sectional view of the laminated structure having the grooves.

FIG. 1 is a transparent plan view of a laminate according to a preferred embodiment, prepared by layering dielectric thin films and thin-film internal electrodes on a substrate; FIG. 2 is a front sectional view of main portions of the laminate; FIG. 3 is a plan view of a laminated structure including the substrate and the laminate, having grooves; and FIG. 4 is a front sectional view of the structure shown in FIG. 3.

(1) Dielectric thin films 2 and thin-film internal electrodes 3 are alternately deposited on a sapphire substrate 1 having a thickness of about 0.2 mm, as shown in FIG. 1, to prepare a laminate 4 (see FIG. 2). In this instance, the thin-film internal electrodes 3 are alternately displaced in a predetermined direction (for example, in the X direction as shown in FIG. 1) to form an overlap portion.

Specifically, (Ba, Sr)TiO$_3$ is deposited to form one of the dielectric thin films 2 having a thickness of about 150 nm on the substrate 1 by MOCVD, and subsequently, Pt is deposited to a thickness of about 130 nm to form one of the thin-film internal electrodes 3 by sputtering using a Si shadow mask. These depositions are repeated, so that the dielectric thin films 2 and the thin-film internal electrodes 3 are alternately layered. The Si shadow mask is prepared by anisotropic etching and has a predetermined pattern.

The thin-film internal electrodes 3 include first internal electrodes 3a and second internal electrodes 3b. The Pt first internal electrodes 3a have a width W1 of about 0.1 mm and the Pt second internal electrodes 3b have a width W2 of about 0.12 mm. The first internal electrodes 3a and the second internal electrodes 3b are alternately deposited so as to form an overlap portion having a length L0 of about 260 µm. Finally, (Ba, Sr)TiO₃ is deposited again to a thickness of about 300 nm.

(2) The upper surface of the dielectric thin film is covered with a silicon oxide protective film (not shown in the figure) having a thickness of 300 nm by MOD. In the MOD, a material solution is applied to the dielectric thin film by spin coating, followed by drying, and is subsequently fired in an atmosphere of oxygen.

(3) Turning to FIGS. 3 and 4, a laminated structure 5, which includes the substrate 1 and the laminate 4, is half cut with a blade having a width of about 200 µm from the laminate side in the direction designated by arrow A to form first grooves 11. In this half-cut step, the laminate 4 is cut in the thickness direction and the substrate 1 is partially cut (up to a point where the rest of the thickness of the substrate is about 100 µm).

In this instance, the spaces G1 and G2 between the first grooves 11 and the second internal electrodes 3b (W2=120 µm) are about 20 µm.

After cleaning and drying, spin coating with the foregoing material solution and firing are performed to form a silicon oxide protective film having a thickness of about 300 nm. Thus, the surface of the dielectric thin film 2 and the side surfaces of the first grooves 11, which include the cut surfaces of the laminate 4 defining the upper side surfaces of the first grooves 11 and the half-cut surfaces of the substrate 1 defining the lower side surfaces, are coated with the silicon oxide film.

(4) The laminated structure 5 is half cut with a blade having a width of about 200 µm, as above, in the direction designated by arrow B (FIG. 3) and in the thickness direction from the laminate side, as show in FIGS. 3 and 4. Thus, second grooves 12 having a width W3 of about 200 µm are provided in the laminated structure 5. In this step, the laminate 4 is cut in the thickness direction and the substrate 1 is cut partway (up to a point where the rest of the thickness T (FIG. 4) of the substrate is about 100 µm). In this instance, the space G3 between one second groove 12 and the end of the second internal electrode 3b and the space G4 between the other groove 12 and the end of the first internal electrode 3a are each about 40 µm, and the length L1 (FIGS. 3 and 4) of the laminate 4 between the second grooves 12 is about 340 µm.

Figure 5:
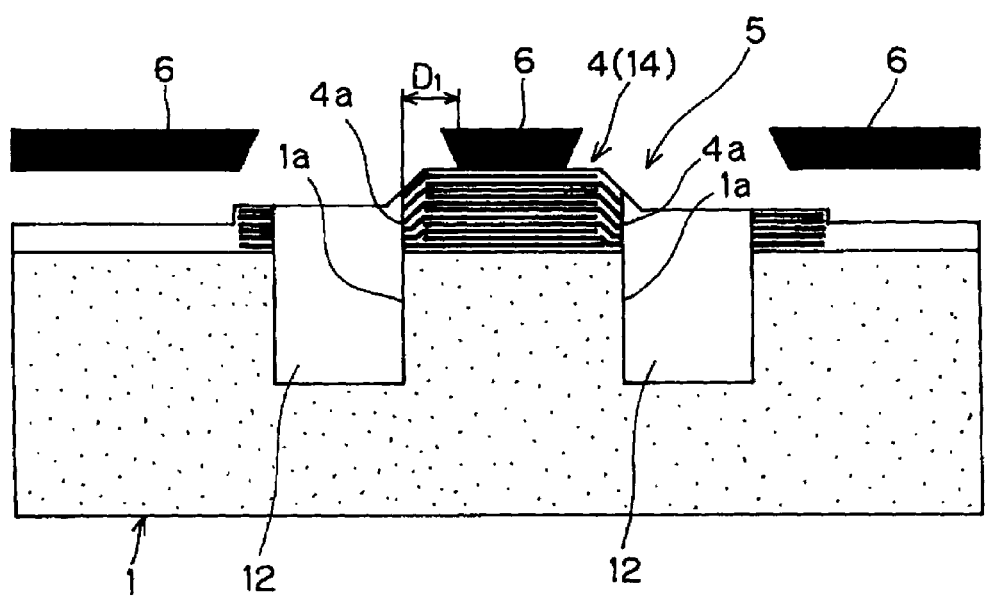
FIG. 5 is a front sectional view of the laminated structure having the grooves, provided with a metal mask.
Figure 6:
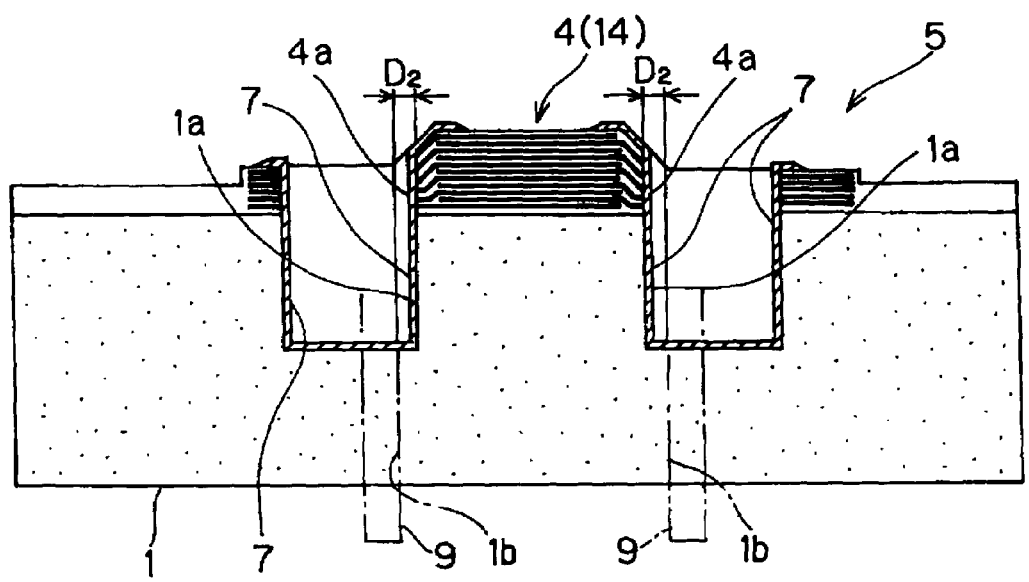
FIG. 6 is a front sectional view of the laminated structure provided with external electrodes on the side surfaces and bottom surfaces of the grooves by DC sputtering.

(5) After cleaning and drying, Pt, Ni, and Ag are deposited, in that order, to respective thicknesses of approximately 200 nm, 300 nm, and 300 nm by DC sputtering with a metal mask 6, as shown in FIG. 5. Thus, external electrodes 7 having a multilayer structure are formed, as shown in FIG. 6. In this step, the metal mask 6 is located such that the portion thereof coming into contact with the surface (silicon oxide film) of the laminate 4 is a distance D1 (about 50 µm) apart from the cut surfaces 1a and 4a of the substrate 1 and the laminate 4, as shown in FIG. 5. The metal mask 6 also has a tapered shape whose surface not coming into contact with the laminate juts toward the second grooves 12. This tapered shape is formed by laser machining of a SUS plate. The susceptor is tilted 30° with respect to the target and rotated during sputtering.

Figure 7:
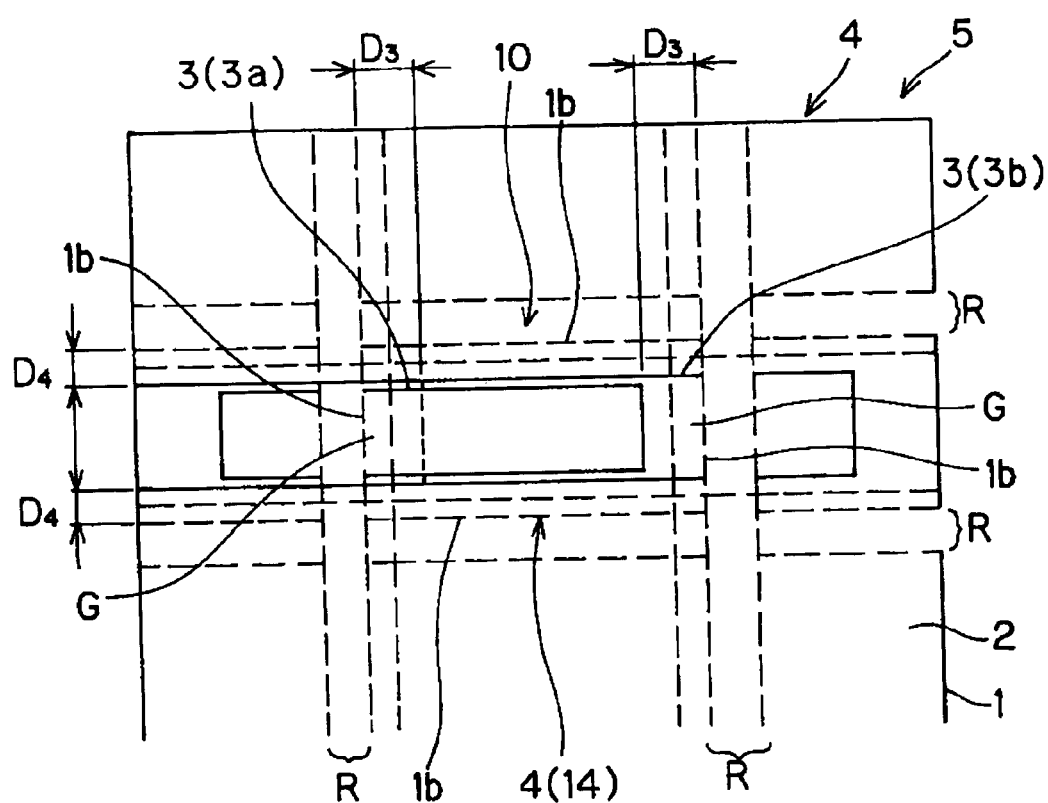
FIG. 7 is a plan representation of a technique for fully cutting the laminated structure along the grooves.

(6) The regions R of the laminated structure 5, designated by dashed lines shown in FIG. 7, are fully cut with a blade 9 (FIG. 6) having a thickness of about 50 µm.

In this instance, each full-cut surface 1b of the substrate 1 juts out with respect to the corresponding half-cut surface 1a having the external electrode 7 to form a step with a height of D2 (about 30 µm).

Figure 8:
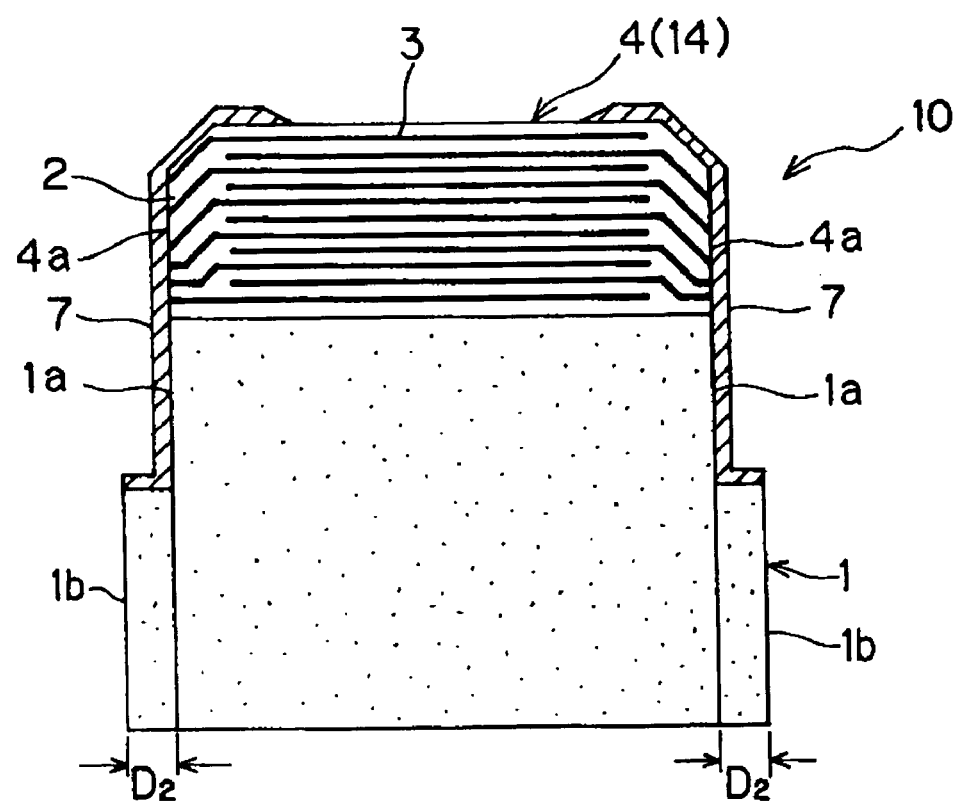
FIG. 8 is a sectional view of a thin-film multilayer electronic component (thin-film multilayer capacitor) manufactured by a method according to a preferred embodiment of the present invention.

Thus, a thin film multilayer capacitor of about 0.4 mm in length, about 0.2 mm in width, and about 0.24 mm in height is completed, as shown in FIG. 8.

In the present preferred embodiment, the distances D3 (FIG. 7) from the full-cut surfaces 1b (FIG. 8) of the substrate 1 to the end of the electrodes 3 opposing the full-cut surfaces 1b are preferably about 70 µm, and the distance D4 (FIG. 7) form the full-cut surfaces 1b to the sides of the second internal electrode 3b are preferably about 40 µm.

As described above, in the present preferred embodiment, portions where the first and second internal electrodes 3a and 3b do not overlap are cut from the laminate side to form the second groves 12; and the external electrodes 7 are formed on the resulting cut surfaces 4a of the laminate 4 where the ends of the internal electrodes 3a and 3b are exposed and the half-cut surfaces 1a of the substrate 1. Then, substrate 1 is fully cut along the grooves 11 and 12 so as not to substantially remove the external electrodes 7. Thus, the external electrodes 7 are efficiently formed before the laminate 4 with the substrate 1 is cut into elements.

Consequently, a miniaturized high-performance thin-film multilayer capacitor 10 can be efficiently manufactured at low cost, without such difficulty of handling that occurs when external electrodes are formed after cutting the laminated structure into elements.

The full cut of the substrate 1 is performed, along the second grooves 12, in portions where the external electrodes 7 on the cut surfaces 4a of the laminate 4 and on the cut surfaces 1a of the substrate 1 will not be substantially removed so as to form steps, each jutting out with respect to the corresponding half cut surface 1a. Consequently, the resulting thin-film multilayer capacitor 10 exhibits a high reliability of connection between the external electrodes 7 and the thin-film internal electrodes 3.

FIGS. 1 to 8 illustrate a case where one thin-film multilayer capacitor is manufactured, for convenience. However, in practice, a laminate for many elements is formed on a mother substrate and it is divided into pieces to manufacture many thin-film multilayer capacitors, using the method of the present invention.

Figure 9:
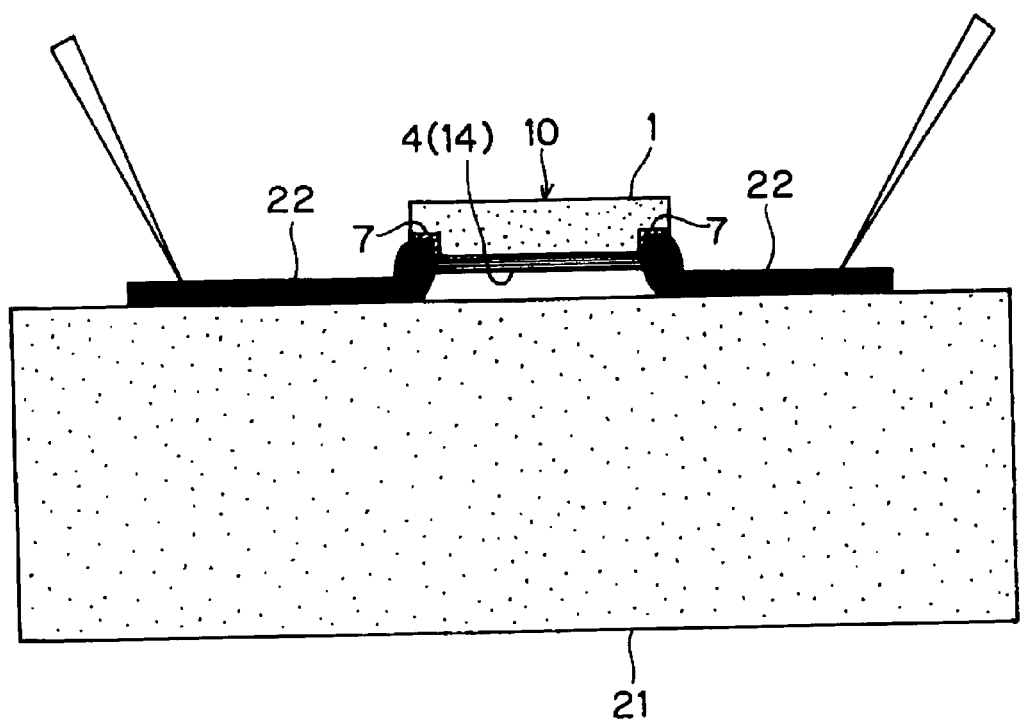
FIG. 9 is a representation of the thin-film multilayer electronic component mounted on a wiring board.

The resulting thin-film multilayer capacitor 10, which includes the substrate 1, the laminate 4 formed by alternately layering the dielectric thin films 2 and the thin-film internal electrodes 3, and the external electrodes 7, was soldered onto terminals 22 on a wiring board 21, as shown in FIG. 9, and was subjected to a measurement of capacitance at about 1 kHz and about 100 mV. As a result, the capacitance was about 10.6 nF and the dielectric dissipation factor was about 1.8%, on an average of 20 samples.

While the present invention has been described with respect to preferred embodiments thereof, it will be readily appreciated by those skilled in the art that various modifications may be made without departing from the scope and spirit of the invention, as to, for example, the materials and shapes of the substrate, dielectric thin films, and the internal electrodes; deposition techniques; the number of layers; the material, shape, and deposition technique of the external electrodes and the protective film; the degree of the displacement of the internal electrodes; and the step height between the half-cut surfaces and the full-cut surfaces of the substrate.

What is claimed is:

1. A method for manufacturing a multilayer electronic components, comprising the steps of:

forming a laminate of dielectric films and internal electrodes on a substrate;

cutting the entire thickness of the laminate and part of the thickness of the substrate to form first grooves including first cut surfaces of the laminate;

forming a protective film on the first cut surfaces of the laminate;

cutting the entire thickness of the laminate and part of the thickness of the substrate to form second grooves including second cut surfaces of the laminate;

forming external electrodes on the second cut surfaces; and fully cutting the substrate in the thickness direction along the first and second grooves after the step of forming the protective film and the step of forming the external electrodes.

2. The method according to claim 1, wherein the step of forming the laminate includes alternately layering dielectric thin films and thin-film internal electrodes on each other to form the laminate such that the thin-film internal electrodes are alternately displaced in a predetermined direction to form an overlap portion.

3. The method according to claim 1, wherein the step of fully cutting the substrate is performed so as to form steps, each of the steps being located between resulting first and second full-cut surfaces of the substrate and corresponding first and second half-cut surfaces, and the first and second full cut surfaces jut out with respect to the first and second half-cut surfaces.

4. The method according to claim 2, wherein the electronic components is a thin-film multilayer capacitor.

5. The method according to claim 4, wherein the thin-film multilayer capacitor includes portions of the substrate, the alternately-layered dielectric thin films and thin-film internal electrodes, and the external electrodes, each electrically connected to the thin-film internal electrodes.

6. The method according to claim 2, wherein the substrate is made of sapphire.

7. The method according to claim 1, wherein the dielectric films are made of one of $BaTiO_3$ and $SrTiO_3$ and the internal electrodes are made of Pt.

8. The method according to claim 1, wherein the first grooves further include first half-cut surfaces of the substrate.

9. The method according to claim 1, wherein the second grooves further include second half-cut surfaces of the substrate.

10. The method according to claim 2, wherein the first grooves extend in a direction substantially parallel to said predetermined direction.

11. The method according to claim 2, wherein the second grooves extend in a direction substantially perpendicular to said predetermined direction.

* * * * *